| United States Patent [19] | [11] Patent Number: 4,861,576 |
| Stegelman | [45] Date of Patent: Aug. 29, 1989 |

[54] METHOD FOR REDUCING CORROSION IN A BYPASS SYSTEM

[75] Inventor: Albert F. Stegelman, Borger, Tex.

[73] Assignee: Phillips Petroleum Company, Bartlesville, Okla.

[21] Appl. No.: 202,775

[22] Filed: Jun. 3, 1988

[51] Int. Cl.$^4$ ............................................. C01B 17/02
[52] U.S. Cl. ................................ 423/574 R; 423/220; 423/244; 423/573.1; 423/576.4; 423/576.6
[58] Field of Search ................ 423/220, 574 R, 573.1, 423/576.4, 576.6, 244, 244 R

[56] References Cited

U.S. PATENT DOCUMENTS 4,115,148  9/1978  Okubo et al. ..................... 134/21
4,478,811  10/1984  Hass ............................... 423/574 R

OTHER PUBLICATIONS

N.P.R.A. Question & Answer Session on Refining & Petrochemical Tech., 1979, p. 122.
N.P.R.A. Q. & A. Session on Refining & Petrochemical Technology, 1980, pp. 134–135.
N.P.R.A. Q. & A. Session on Refining & Petrochemical Technology, 1986, pp. 158–159.
N.P.R.A. Q. & A. Session on Refining & Petrochemical Technology, 1987, p. 162.
Chemical Engineers' Handbook, 5th ed., Perry, R. H. and Chilton, C. H., 1973, pp. 23≠26.
Petroleum Refining Technology & Economics, Gary, J. H. and Handwerk, G. E., 1975, pp. 190–200.

Primary Examiner—Gregory A. Heller
Attorney, Agent, or Firm—George E. Bogatie

[57] ABSTRACT

A method and apparatus for reducing leakage of process fluid through an ordinarily closed bypass conduit is disclosed which comprises a bypass conduit connected in parallel with a fluid processing unit so that a blocked-in portion of the bypass conduit may be formed and a purge fluid added to the blocked-in portion to sweep out process fluid and to maintain pressure in the blocked-in portion.

12 Claims, 1 Drawing Sheet

METHOD FOR REDUCING CORROSION IN A BYPASS SYSTEM

BACKGROUND OF THE INVENTION

This invention relates to the field of corrosion reduction and fluid leakage in process piping. This invention also relates to the field of process control.

The prior art has recognized the need for special methods for handling many different types of fluid processing units. These units are useful for converting a less desirable inlet fluid stream into a more desirable outlet fluid stream. For example some fluid processing units take streams containing highly toxic materials and convert them into streams containing safe materials, some units convert waste streams into valuable streams which can be sold, and some units convert low value streams of fluids into higher value streams of fluids. These types of units are often placed in service where either because of cost or space limitations it is highly desirable that the unit operate 100% of the time. Unfortunately, in practical applications, these types of units must sometimes be shut down for example to regenerate a catalyst, regenerate an absorbent, replace broken equipment, install new equipment or to provide for the safety of human operators and the environment around the unit. In many instances, during the period the unit is incapable of processing fluid, some means must be employed whereby the process fluid can be routed to other units for processing or to storage for later processing by the original unit. These means for routing process fluid around units during the times that the unit it unavailable are herein referred to as a bypass means since these means provide a way for fluids to bypass their normal routes of processing and flow instead through alternative routes.

Often the process fluids are corrosive or contain corrosive substances so that equipment used in the fluid processing units and in the bypass means must be impervious to, or at least resistant to corrosion from the process fluid. The prior art has recognized that excessive corrosion may occur when corrosive fluids are left in contact with materials used to construct these processing units and fluid bypass means. The prior art has also recognized that most bypass means are actually in use a small percentage of the time and that it is highly advantageous to drain the corrosive fluid from the bypass means during extended periods of nonuse in order to prevent some corrosion that would otherwise occur. One common type of bypass means used to achieve this result is termed a double block and bleed system wherein the bypass means is a conduit which can be blocked-in preventing flow through the conduit, with provisions to thereafter drain (bleed) the fluid in the blocked-in portion.

One of the disadvantages of this type of arrangement is that when valves are located on the ends of the conduit and are closed to form the blocked-in portion, these valves may leak and process fluid may again enter the conduit subjecting the conduit to additional corrosion. Another disadvantage to the double block and bleed apparatus is that sometimes additional storage facilities or expensive additional processing units are required to store or process the fluid which is bled from the blocked-in conduit. Another disadvantage of the double block and bleed type apparatus is that fluid which may leak through the closed valves may not only corrode the process piping but may also cause additional problems for other downstream units or for the atmosphere to which it is passed.

SUMMARY OF THE INVENTION

It is an object of this invention to overcome these disadvantages and to provide a relatively inexpensive method and apparatus which will reduce corrosion in bypass means. It is also an object of this invention to reduce or eliminate the storage or processing facilities necessary to handle blocked-in process fluid. Another object of this invention is to provide a method and apparatus for reducing loss of process fluid through the bypass means during times when it is not desired to pass process fluid through the bypass means. These and other objects of the invention will be apparent from the description which follows.

This invention comprises the addition of a source of purge fluid to the bypass means so that process fluid may be purged from the bypass means by the flow of the inert fluid. This invention also comprises a method of controlling the bypass means whereby inert fluid is continuously supplied to the bypass means so that any leaks between the processing unit and the bypass means occur in the direction from the bypass means towards the processing unit.

DESCRIPTION OF THE PREFERRED EMBODIMENTS

Figure 1:
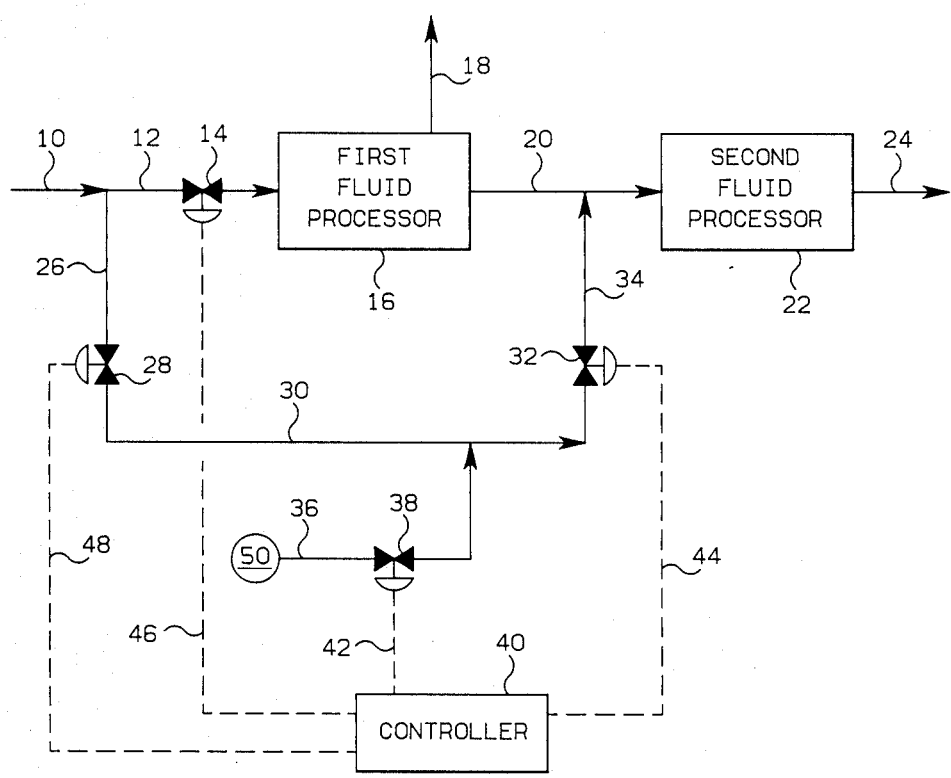
FIG. 1, forming a part hereof, is a flow diagram depicting one embodiment of the inventive bypass means.

This invention can be readily understood by reference to FIG. 1 which depicts an apparatus which provides for fluid bypass around a fluid processing unit. As shown, a fluid processing unit 16 is employed to process a fluid which may be introduced through conduit 12. In normal operation, a fluid processing zone in fluid processing unit 16 will convert fluids introduced through conduit 12 into products, by-products or waste materials which may be yielded from fluid processing unit 16 through conduit 18 or through conduit 20 or through both conduits 18 and 20.

In one embodiment, some or all of the material yielded from fluid processing unit 16 may be passed to fluid processing unit 22, for example material passing through conduit 20 may be passed into fluid processing unit 22 in order to convert or process the material passing through conduit 20 into a more desirable material which can then be yielded from fluid processing unit 22 through conduit 24.

During normal operation it is expected that fluid processing unit 16 would operate continuously on fluids supplied from a process fluid source supplied through conduit 10. The process fluid source can be any process, unit, plant or natural source which can provide material to flow through conduit 10. At certain times it may be necessary to stop fluid flow through fluid processing unit 16, but impossible or impractical to stop process fluid from flowing through conduit 10. During those times, fluid processing unit 16 can be effectively isolated from the process fluid source by closing valve 14 operably positioned in conduit 12 so that flow through conduit 12 is substantially reduced or stopped altogether. If process fluid continues to be supplied from its source through conduit 10 after valve 14 has been closed, it is apparent that a bypass means connected in parallel with fluid processing unit 16 would be necessary in order to provide for continued flow through conduit 10. In the drawing, the bypass means has been depicted as conduit 26, conduit 30 and conduit 34 with valve 28 and valve 32 respectively operably positioned therebetween, so that when valve 14 is closed, valve 28 and valve 32 are open and fluid may flow through conduit 26, conduit 30 and conduit 34. When the time is again reached where it is appropriate to pass fluid through fluid processing unit 16, valve 14 must be opened and thereafter valve 28 or valve 32 or both valves 28 and 32 may be closed so that fluid flowing through conduit 10 will be passed through only conduit 12 and valve 14 into fluid processing unit 16. When both valves 28 and 32 are closed, they form a blocked-in portion of the bypass means.

This invention provides for the introduction of a purge fluid to the bypass means. This is depicted in drawing FIG. 1 as conduit 36 which is operably connected between a purge fluid source 50 and conduit 30 so that purge fluid may flow from the purge fluid source 50 through conduit 36 and into conduit 30. In another embodiment, valve 38 may be operably positioned in conduit 36 so that flow of purge fluid through conduit 36 may be regulated. The purge fluid may be any fluid that is different from the process fluid, but is preferably non-corrosive to the materials used to construct the conduits and valves and is more preferably an inert fluid such as nitrogen.

Although it is possible to manually regulate the relative valve stem position in valves 14, 28, 34 and 38 it is most advantageous if these valves are controlled automatically. This may be accomplished by connecting each valve to a means for controlling fluid flow which is capable of controlling the relative valve stem position in each valve thereby controlling the flow of fluids through each valve. It is contemplated that each valve may have a separate controller or each valve may be connected to the same controller as depicted in FIG. 1 where valve 14 is connected to controller 40 by signal path 46, valve 28 is connected to controller 40 by signal path 48, valve 32 is connected to controller 40 by signal path 44 and valve 38 is connected to controller 40 by signal path 42. Controller 40 may be adapted to accept and transmit pneumatic or electric or electromagnetic signals which may flow along signal paths 42, 44, 46 and 48. It is contemplated that controller 40 would be capable of both receiving signals representative of the valve stem position and sending signals capable of maintaining or changing the valve stem position of the valves. It is also contemplated that controller 40 may be a computer with software designed for opening and closing the appropriate valves at the appropriate times.

One desirable application of this invention is in the processing of a tail gas derived from a Claus sulfur recovery unit. The working of a Claus sulfur recovery unit is more thoroughly described in Petroleum Refining Technology and Economics, James H. Gary, Glenn E. Handwerk, Marcel Dekker Inc., 1975, pp. 190–200, the disclosure of which, hereby incorporated by reference, notes that such units often yield a tail gas which may contain high concentrations of hydrogen sulfide, $H_2S$, or sulfur oxides, $SO_x$, or both. Statutory limits on the emission of sulfur to the atmosphere require that tail gas from a Claus sulfur recovery unit be further processed to reduce the concentration of sulfur before the gas can be released to the atmosphere. This is often achieved by passing the tail gas to a tail gas sulfur recovery unit where sulfur-containing gases such as $H_2S$ and $SO_2$ are converted to elemental sulfur and a gas of reduced sulfur concentration which is then separated from the elemental sulfur. The gas of reduced sulfur concentration may be released to the atmosphere or, as is often the case, passed to an incinerator and burned to ensure that all remaining sulfur is released to the atmosphere as $SO_2$ and any hydrocarbons remaining in the gas are converted to $CO_2$ and $H_2O$.

Referring again to FIG. 1, the tail gas from the Claus sulfur recovery unit is conveyed through conduit 10 and conduit 12 to the tail gas sulfur recovery unit shown as fluid processing unit 16. The fluid processing zone in the tail gas sulfur recovery unit is maintained at conditions sufficient to convert the tail gas to a first stream enhanced in sulfur concentration and a second stream of gases of reduced sulfur concentration. The stream enhanced in sulfur concentration produced in the tail gas sulfur recovery unit is removed through conduit 18 while gases of reduced sulfur concentration are removed through conduit 20 and either released to the atmosphere or passed to an incinerator shown as fluid processing unit 22. If passed to an incinerator, gases yielded from the incinerator are then released to the atmosphere through conduit 24.

Since the statutory limits on sulfur which may be released to the atmosphere through conduit 24 are based on an average value over a several hour period, it is possible for the instantaneous sulfur concentration in the incinerated gases passing through conduit 24, to at times be higher than the legal average concentration as long as the instantaneous sulfur concentration in the incinerated gas has been or at some future time will be lower than the legal average so that over the entire averaging period the total amount of sulfur released to the atmosphere is at or below the statutory limits. If the tail gas sulfur recovery unit is normally capable of reducing the sulfur concentration of the tail gas to a value well below the statutory limits, then it is possible during times of upset or regeneration in the tail gas sulfur recovery unit to bypass the tail gas processing unit for a relatively short amount of time and yet maintain the overall release of sulfur to the atmosphere within statutory limits.

In the past, the means of bypassing the tail gas sulfur recovery unit has consisted of a conduit with one valve positioned therein so that when the valve was open, flow through the bypass conduit was possible, and when the valve was closed, flow through the bypass conduit was not possible. During past operations it was discovered that even though the valve in the bypass conduit was closed, some sulfur-containing gas was leaking through the valve and eventually making its way to the incinerator where it was thereafter released to the atmosphere. Although the total amount of sulfur released to the atmosphere during past operations was within statutory limits, it was desirable to reduce the amount of sulfur-containing gas leaking through the bypass system so that the total amount of sulfur released to the atmosphere was well below statutory limits.

This invention reduces and can even substantially eliminate sulfur gas leakage through the bypass system by adding a second valve and making a provision for the introduction of an inert fluid such as nitrogen to the bypass system between the two valves. Referring again to FIG. 1, the bypass means is depicted as conduit 26, conduit 30 and conduit 34 with valve 28 and valve 32 operably positioned therein. Conduit 36 is connected between a supply of nitrogen depicted as purge fluid source 50, and conduit 30 so that nitrogen, can flow through conduit 36 and into conduit 30 whenever valve 38 is open. The nitrogen purge not only sweeps out corrosive sulfur-containing gases from the bypass means, it also provides a sufficient back pressure in conduit 30 so that any leak through valve 28 is not in the direction of from conduit 26 to conduit 30 as before, but is in the direction of from conduit 30 to conduit 26. This is accomplished by regulating the pressure in conduit 30 so that it is higher than the pressure in conduit 26. The pressure in conduit 30 can be regulated by manipulating valve 38 and insuring that the pressure of the nitrogen source is higher than the pressure in conduit 26.

The maintenance of back pressure in conduit 30 has been found to be of substantial benefit in reducing the amount of sulfur-containing gases leaking through the closed bypass means. It has therefore been found to be desirable to maintain valve 38 open any time valves 32 and 28 are both closed so that nitrogen may be introduced to the blocked-in portion of the bypass means. Thus, during normal operation, valve 14 is open allowing sulfur-containing gases to be passed to the tail gas sulfur recovery unit, valve 28 and valve 32 are closed so that flow through the bypass means is substantially reduced, and valve 38 is open so that nitrogen may be continuously passed into conduit 30 thereby ensuring that any leak through valve 28 is of gases flowing back from conduit 30 into conduit 26 then into conduit 12 and then into the tail gas sulfur recovery unit. During times of upset or regeneration in the tail gas sulfur recovery unit or any time it is desirable to bypass the tail gas sulfur recovery unit, it is necessary to open valves 28 and 32 so that sulfur-containing gases may flow through conduit 26 into and through conduit 30 and into and through conduit 34. If fluid processing unit 16 provides resistance to fluid flow substantially greater than the bypass means, fluid will flow through the bypass means rather than fluid processing unit 16. If not, it may be necessary to close valve 14 in order to insure that process fluid flows through the bypass means and not fluid processing unit 16.

When it is desirable to stop flow through the bypass means and resume processing sulfur-containing gases through the tail gas sulfur recovery unit, several options are available for controlling valves 14, 28, 32 and 38. In one option, valve 14 is opened either before or at substantially the same time as both valves 28 and 32 are closed. After valves 28 and 32 are both closed then valve 38 may be opened so that back pressure may be maintained in conduit 30.

Another option for control is where valve 14 is opened either before or at substantially the same time as valve 28 is closed. Thereafter, and while valve 32 is still opened, valve 38 is opened so that sulfur-containing gases in conduit 30 are swept out and displaced from conduit 30 through valve 32 and into conduit 34 by nitrogen supplied from purge fluid source 50. After a time sufficient to remove some or all of the sulfur-containing gases from conduit 30, valve 32 may be closed while valve 38 is maintained in the open position so that nitrogen back pressure is maintained in conduit 30. This method of control has an advantage over the previously described method in that some corrosive gases are removed from conduit 30 thereby reducing the corrosion that occurs in conduit 30 and valves 28 and 32.

A third and preferred method of control is where valve 14 is opened either before or at substantially the same time as valve 32 is closed. Thereafter and while valve 28 is still open, valve 38 is opened allowing nitrogen to displace and sweep some or all of the sulfur-containing gases from conduit 30 through valve 28 and into conduit 26. After valve 38 has been opened and some or all of the sulfur-containing gases have been swept from conduit 30, it is then desirable to close valve 28 while maintaining valve 38 open so that nitrogen back pressure can be maintained in conduit 30. In this third method, not only is corrosion reduced in valves 28 and 32 and conduit 30, but less sulfur is released to the atmosphere since sulfur-containing gases swept from conduit 30 must then pass through the tail gas sulfur recovery unit where some of the sulfur contained in the gases is converted to elemental sulfur and removed through conduit 18. It is also apparent that when purging the entire system it may be desirable to maintain all valves 14, 28, 32 and 38 in the open position.

This invention is further illustrated in the example which follows.

EXAMPLE

An apparatus similar to that shown in FIG. 1 was used to remove sulfur from a sulfur-containing gas introduced through conduit 10. The sulfur dioxide concentration in the incinerator stack gases passing thorugh conduit 24 was continuously measured and an average value in parts per million by weight (ppm) recorded every hour.

During a control run, the apparatus was operated with valve 28 closed but without the inventive purge system or valve 32 in the bypass system. The hourly average values for $SO_2$ concentration in the stack gases are shown in Table I below.

During the experimental run, the apparatus was operated with both valves 28 and 32 closed and a nitrogen purge being added to conduit 30 through conduit 36, except for hours 12, 13 and 14 when both valves 28 and 32 were open due to an upset in the Claus unit. The hourly average values for $SO_2$ concentration in the stack gases are shown in Table I below.

TABLE I

| Hour | $SO_2$ Concentration, ppm | |
|---|---|---|
| | Control | Experimental |
| 1 | 141 | 9 |
| 2 | 169 | 8 |
| 3 | 138 | 8 |
| 4 | 131 | 8 |
| 5 | 128 | 8 |
| 6 | 128 | 8 |
| 7 | 143 | 8 |
| 8 | 127 | 8 |
| 9 | 133 | 8 |
| 10 | 141 | 34 |
| 11 | 136 | 9 |
| 12 | 167 | 1145 |
| 13 | 163 | 847 |
| 14 | 127 | 442 |
| 15 | 148 | 31 |
| 16 | 143 | 20 |
| 17 | 123 | 17 |
| 18 | 127 | 14 |
| 19 | 125 | 14 |
| 20 | 125 | 13 |
| 21 | 126 | 13 |
| 22 | 139 | 16 |
| 23 | 150 | 14 |
| 24 | 145 | 14 |

It can easily be seen from the data in Table I that without the inventive bypass purge system, the $SO_2$ concentration in the incinerator stack gas was generally in the range of 125–150 ppm with an average concentration over the 24 hour period of 138 ppm. With the inventive bypass purge system, in the absence of process upsets, the $SO_2$ concentration in the incinerator stack was generally in the range of 8–20 ppm. The average $SO_2$ concentration during non-upset periods was 13 ppm, a value well below the 138 ppm average that occurred without the inventive bypass purge.

If the statutory limit on $SO_2$ release had been 250 ppm averaged over any 12 hour period, then both the control run and the experimental run would have been in compliance with the law. If, however, the upset which occurred in hours 12–14 of the experimental run had instead occurred during the control run, the control run average would have been out of compliance for the 12 hour period including hours 3–14 with an average $SO_2$ concentration of 303 ppm. Thus the inventive bypass system helps maintain compliance with statutory limits on $SO_2$ release to the atmosphere.

While this invention has been described in detail for the purpose of illustration, it is not to be limited thereby, but is intended to cover all changes and modifications within the spirit and scope thereof.

That which is claimed is:

1. A method for reducing leakage of a sulfur-containing process fluid through a bypass means around a fluid processor when said sulfur-containing process fluid is flowing through said fluid processor, said method comprising the steps of:

establishing a blocked-in portion in said bypass means;

feeding said sulfur-containing process fluid to said fluid processor;

introducing an inert purge fluid into said blocked-in portion of said bypass means when bypass circulation of said sulfur-containing process fluid is undesired; and maintaining sufficient pressure of said inert purge fluid in said blocked-in portion to essentially prevent said sulfur-containing process fluid flowing to said fluid processor from leaking into said blocked-in portion of said bypass means.

2. A method in accordance with claim 1 wherein said bypass means around said fluid processor comprises a conduit having a first valve and a second valve operably located therein and wherein said second valve is spaced apart from said first valve and wherein said step of establishing a blocked-in portion in said bypass means comprises:

closing said first valve and said second valve.

3. A method of purging a bypass means around a sulfur-processing unit of sulfur-containing gases, wherein said bypass means comprises a conduit having a first valve and a second valve operably located therein and wherein said second valve is spaced apart from said first valve and wherein means for introducing inert purge fluid is provided at a point in said conduit intermediate said first valve and said second valve, said method comprising the sequential steps of:

(a) closing said first valve;
   (b) opening said second valve;
   (c) introducing a volume of inert fluid through said means for introducing inert purge fluid, wherein sulfur-containing gases are swept from a portion of the bypass means between the open valve and said point in said conduit intermediate said first valve and said second valve;
   (d) closing said second valve;
   (e) opening said first valve; and
   (f) repeating step (c).

4. A method as in claim 3 wherein said sulfur-containing process fluid is a gas containing either $SO_2$ or $H_2S$ or both, and is delivered from a sulfur recovery unit.

5. A method as in claim 4 wherein said fluid processor is maintained at conditions sufficient to yield a first stream enhanced in sulfur concentration and a second stream reduced in sulfur concentration.

6. A method as in claim 5 wherein said second stream is passed to an incinerator.

7. A method in accordance with claim 3 wherein said inert purge fluid is nitrogen.

8. A method of sequentially operating a plurality of valves associated with a sulfur-processing unit, to route sulfur-containing process fluid, and to route inert purge gas, wherein a first conduit is connected between a source of sulfur-containing gas to be processed and said sulfur-processing unit, a second conduit is connected between said source of sulfur-containing gas and a first port of a first valve, a third conduit is connected between a second port of said first valve and a first port of a second valve, a fourth conduit is connected to a second port of said second valve so as to form a bypass means around said sulfur-processing unit, with said first valve and said second valve operably located in said bypass means, a fifth conduit is connected between a source of inert purge fluid and said third conduit, a third valve is operably located in said fifth conduit and a fourth valve is operably located in said first conduit, said method comprising the sequential steps of:

(a) closing said first valve and said second valve to essentially prevent bypass circulation of sulfur-containing process fluid;
   (b) opening said fourth valve so that process fluid may flow through said first conduit into said sulfur-processing unit; and
   (c) opening said third valve to allow flow of a volume of inert purge fluid to flow from said source of inert purge fluid through said fifth conduit to said third conduit.

9. A method in accordance with claim 8 wherein said first valve and said second valve are closed at substantially the same time.

10. A method in accordance with claim 8 wherein the sequential steps recited in paragraphs (a), (b), and (c) are replaced with the following sequential steps:

(d) opening said fourth valve;
   (e) closing said first valve;
   (f) opening said third valve; and
   (g) closing said second valve.

11. A method in accordance with claim 8 wherein the sequential steps recited in paragraphs (a), (b), and (c) are replaced with the following sequential steps:

(d) opening said fourth valve;
   (e) closing said second valve;
   (f) opening said third valve; and
   (g) closing said first valve.

12. A method in accordance with claim 8 wherein the sequential steps recited in paragraphs (a), (b) and (c) are replaced with the following sequential steps:

(d) opening said third valve;
   (e) opening said fourth valve;
   (f) closing said first valve; and
   (g) closing said second valve.

* * * * *